US012798059B2

(12) United States Patent
Sorkin

(10) Patent No.: US 12,798,059 B2
(45) Date of Patent: Nov. 17, 2026

(54) TORQUE TOOL

(71) Applicant: General Technologies, Inc., Stafford, TX (US)

(72) Inventor: Felix Sorkin, Stafford, TX (US)

(73) Assignee: Felix Sorkin, Stafford, TX (US)

( * ) Notice: Subject to any disclaimer, the term of this patent is extended or adjusted under 35 U.S.C. 154(b) by 0 days.

(21) Appl. No.: 19/210,650

(22) Filed: May 16, 2025

(65) Prior Publication Data

US 2025/0353147 A1 Nov. 20, 2025

Related U.S. Application Data

(60) Provisional application No. 63/649,000, filed on May 17, 2024.

(51) Int. Cl.
*B25B 17/02* (2006.01)

(52) U.S. Cl.
CPC .................................... *B25B 17/02* (2013.01)

(58) Field of Classification Search
CPC .............. B25B 13/481; B25B 23/0078; B25B 23/1425; B25B 21/00; B25B 21/002; B25B 17/00
See application file for complete search history.

(56) References Cited

U.S. PATENT DOCUMENTS

| | | | | | |
|---|---|---|---|---|---|
| 3,979,965 | A * | 9/1976 | Vuceta | B25B 17/02 | 81/57.3 |
| 4,287,795 | A * | 9/1981 | Curtiss | B25B 21/002 | 81/57.3 |
| 4,506,567 | A * | 3/1985 | Makhlouf | B25B 13/107 | 81/57.3 |
| 4,535,850 | A * | 8/1985 | Alexander | B25B 23/145 | 173/176 |
| 4,827,810 | A * | 5/1989 | Rushanan | B25B 21/002 | 81/57.13 |
| 5,179,876 | A | 1/1993 | Gadea | | |
| 5,544,553 | A * | 8/1996 | Galat | B25B 13/481 | 81/57.3 |

(Continued)

FOREIGN PATENT DOCUMENTS

WO 2023/025620 2/2023

OTHER PUBLICATIONS

Notification of Transmittal of the International Search Report and the Written Opinion of the International Searching Authority dated Jul. 15, 2025 received in PCT/US2025/029823, 11 pages.

*Primary Examiner* — David B. Thomas
(74) *Attorney, Agent, or Firm* — Ervin Cohen & Jessup LLP

(57) ABSTRACT

Embodiments include a tool having an input drive configured receive a force input and an output drive to transfer the force input to a fastener with the force input being transferred from the input drive to the output drive via a gear train internal to the tool. The force input (torque) may be augmented by the tool. The tool is configured with an input drive and an output drive. The input and output drives may be located at opposite ends of the tool. The input drive is configured to receive a force or torque input. The force input may be from an external drive source or tool. The output drive is configured to mate with and engage with a fastener. A gear train, internal to the tool, is configured to transfer the input force or torque from the input drive to the output drive.

13 Claims, 16 Drawing Sheets

(56) References Cited

U.S. PATENT DOCUMENTS

| | | | | |
|---|---|---|---|---|
| 8,434,389 | B2 * | 5/2013 | Castle | B25B 23/1425 81/57.14 |
| 8,616,093 | B1 | 12/2013 | Maniak | |
| 10,058,983 | B2 * | 8/2018 | Liang | B25B 23/1425 |
| 10,099,350 | B2 * | 10/2018 | Gates | B25B 17/00 |
| 10,427,276 | B2 * | 10/2019 | Barzelay | B25B 17/02 |
| 10,507,567 | B2 * | 12/2019 | Hooks | B25B 23/0021 |
| 11,105,398 | B1 * | 8/2021 | Brodhead | F16H 57/02 |
| 11,511,407 | B2 * | 11/2022 | Nino | B25F 5/001 |
| 11,589,879 | B2 * | 2/2023 | Nino | B25B 23/141 |
| 11,731,248 | B2 * | 8/2023 | Carlsson | B25B 17/00 81/57.3 |
| 11,759,936 | B2 * | 9/2023 | Magda | F16H 1/20 81/57.29 |
| 12,128,530 | B2 * | 10/2024 | Bergmann | B25B 17/00 |
| 12,311,512 | B2 * | 5/2025 | Langhorst | B25B 13/04 |
| 2011/0017023 | A1 | 1/2011 | Tutino | |
| 2012/0103142 | A1 * | 5/2012 | Sroka | B25B 17/02 81/57.3 |
| 2013/0062090 | A1 * | 3/2013 | Winnard | B25B 17/00 173/216 |
| 2016/0067849 | A1 * | 3/2016 | Junkers | B25B 7/10 81/57.3 |
| 2017/0036326 | A1 | 2/2017 | Angello | |
| 2019/0285151 | A1 * | 9/2019 | Paul | F16H 29/12 |
| 2023/0128823 | A1 * | 4/2023 | Tucker | B25F 5/006 81/121.1 |
| 2025/0050473 | A1 * | 2/2025 | Junkers | B25B 17/00 |

* cited by examiner

TORQUE TOOL

CROSS-REFERENCE TO RELATED APPLICATIONS

This application claims priority to U.S. Provisional Patent Application No. 63/649,000, entitled "Torque Tool," filed on May 17, 2024. The entire disclosure of this priority application is incorporated herein by reference in its entirety.

FIELD OF THE INVENTION

The present invention relates generally to a tool for applying torque to a fastener. Specifically, embodiments include a tool having an input drive configured receive a force input and an output drive to transfer the force input to a fastener with the force input being transferred from the input drive to the output drive via a gear train internal to the tool. The force input (torque) may be augmented by the tool.

BACKGROUND

In many applications, various fasteners are used to secure or clamp together different parts, or pieces, of an apparatus or device. A commonly used fastener is a bolt, which is typically secured using a nut. The bolt and nut together create a joint that secures the different parts together and prevent loosening or movement of the parts during operation of the apparatus or device. The parts are held together by a clamping force generated by the nut and bolt that holds the joint together. Typically, a particular torque is required to be applied to the fastener (e.g., a force applied to the bolt by the nut) to generate the proper clamping force and prevent loosening of the joint (e.g., the bolt and nut) during the stress of operation of the apparatus or device.

A tool is typically used to apply the torque to the fastener (e.g., the nut). The tool provides a preload to the fastener (e.g., the bolt) through the nut in a controlled manner. However, in many cases the tool is not configured with to allow it to easy reach and be coupled with the fastener. Further, the tool may not be able to apply sufficient torque, in an efficient manner to the fastener.

These and other drawbacks exist.

SUMMARY

Various embodiments relate to a torque tool. The torque tool, referred to herein as "the tool," is configured with an input drive and an output drive. The input and output drives may be located at opposite ends of the tool. The input drive is configured to receive a force or torque input. The force input may be from an external drive source or tool. The output drive is configured to mate with and engage with a fastener. A gear train, internal to the tool, is configured to transfer the input force or torque from the input drive to the output drive. The torque may be augmented by the tool.

An embodiment includes a torque tool having a body with two halves; an input drive located at a first end of the body; an output drive located at a second end of the body, the second end being located axially opposite the first end; and a gear train internal to the body such that the gear train mechanically couples the input drive to the output drive allowing for continuous transmission of torque from the input drive to the output drive.

Another embodiment includes a torque tool having a body with two halves; an input drive located at a first end of the body; a right angle drive mechanically coupled to the input drive by a gear set; an output drive located at a second end of the body, the second end being located axially opposite the first end; and a gear train internal to the body such that the gear train mechanically couples the input drive to the output drive allowing for continuous transmission of torque from the input drive to the output drive.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
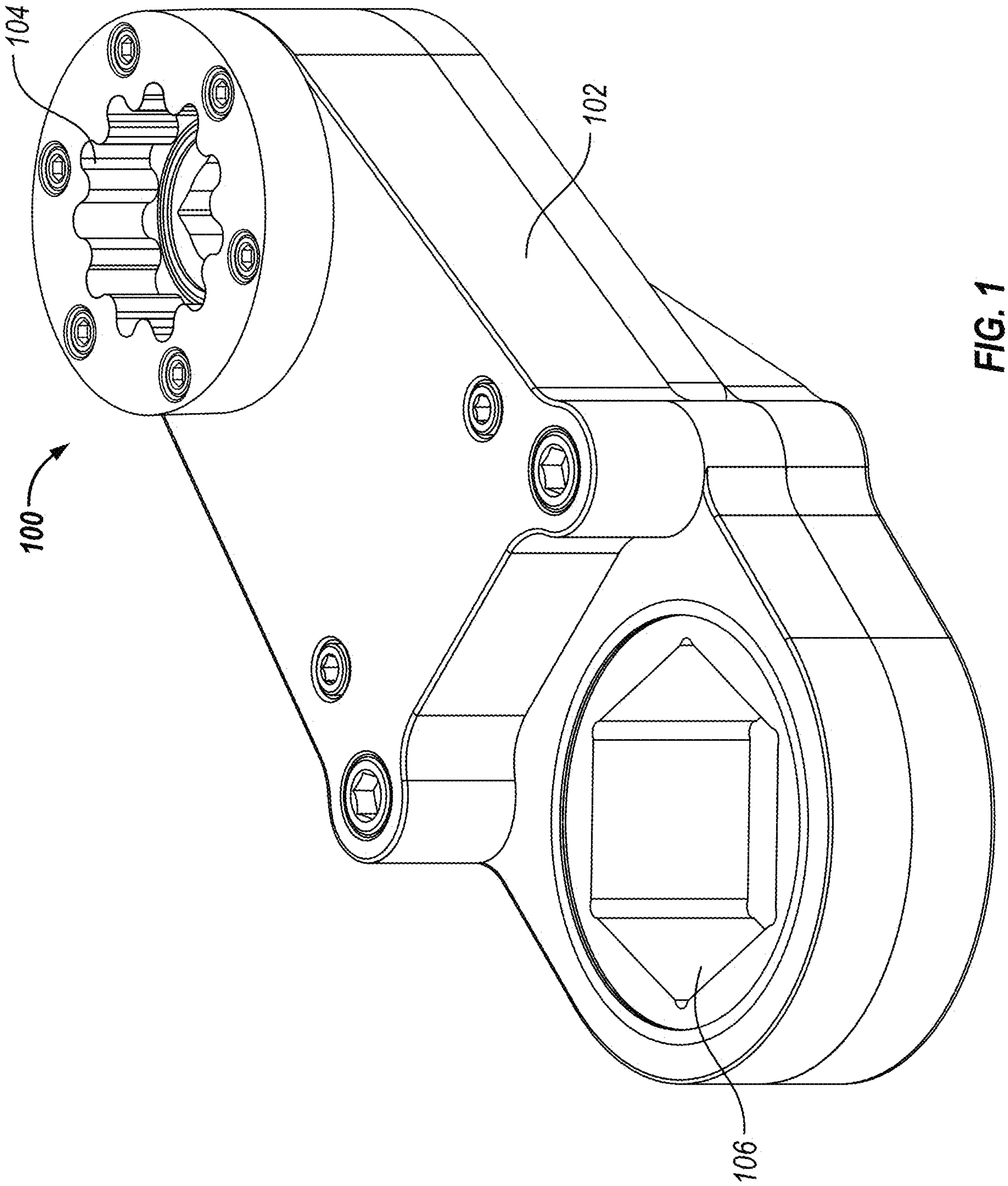
FIG. 1 depicts a perspective view of a torque tool according to exemplary embodiments.
Figure 2:
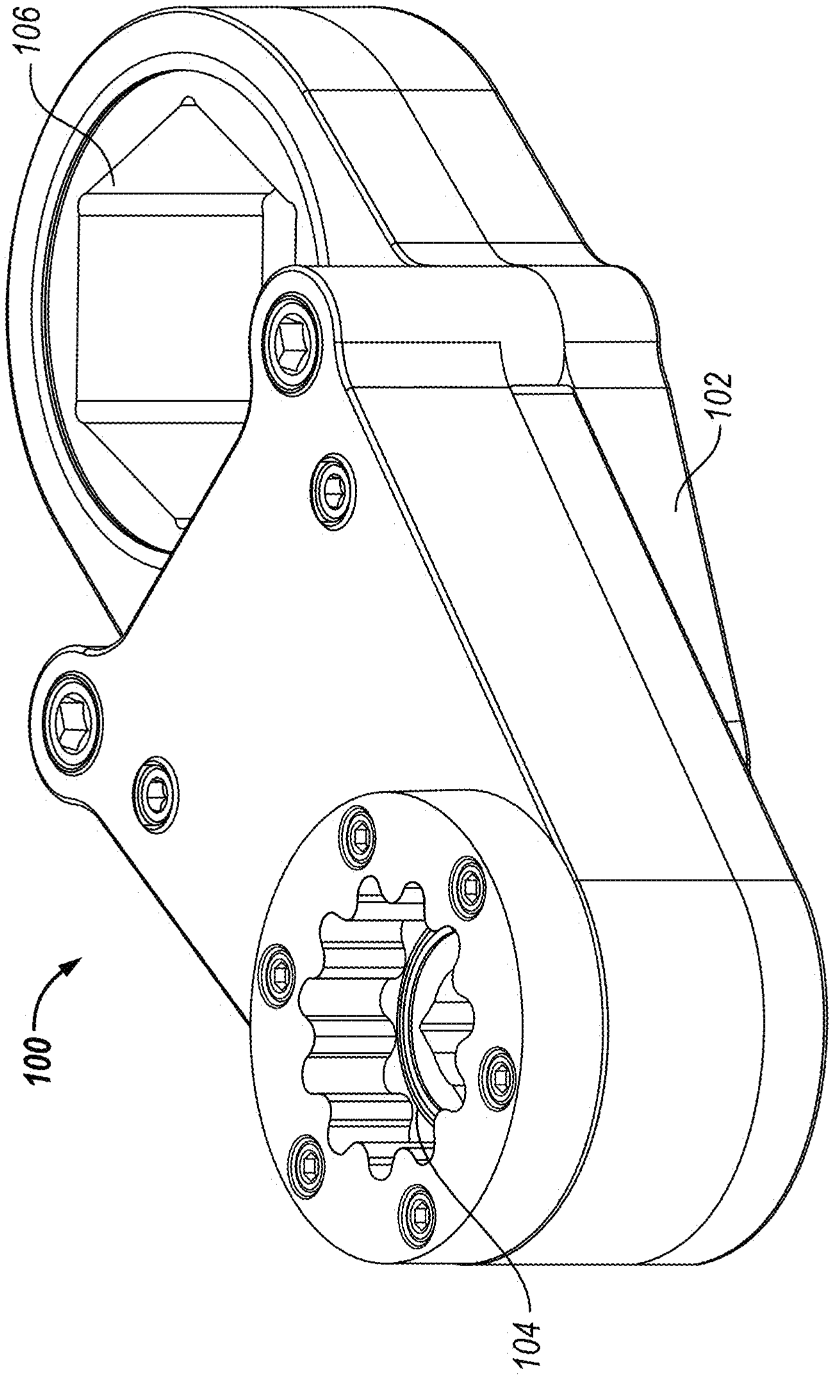
FIG. 2 depicts a second perspective view of the torque tool according to exemplary embodiments.
Figure 3:
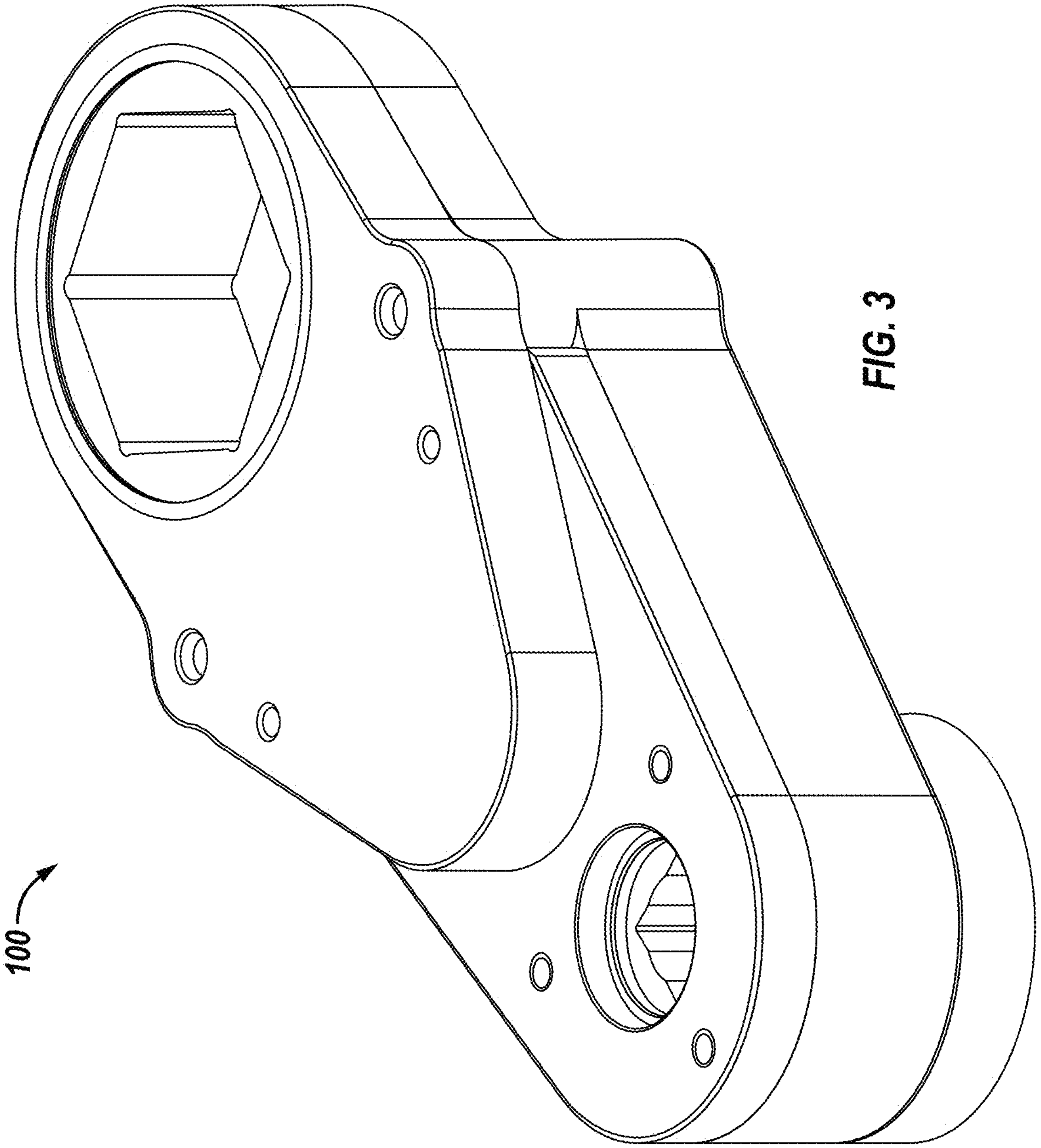
FIG. 3 depicts a bottom perspective view of the torque tool according to exemplary embodiments.
Figure 4:
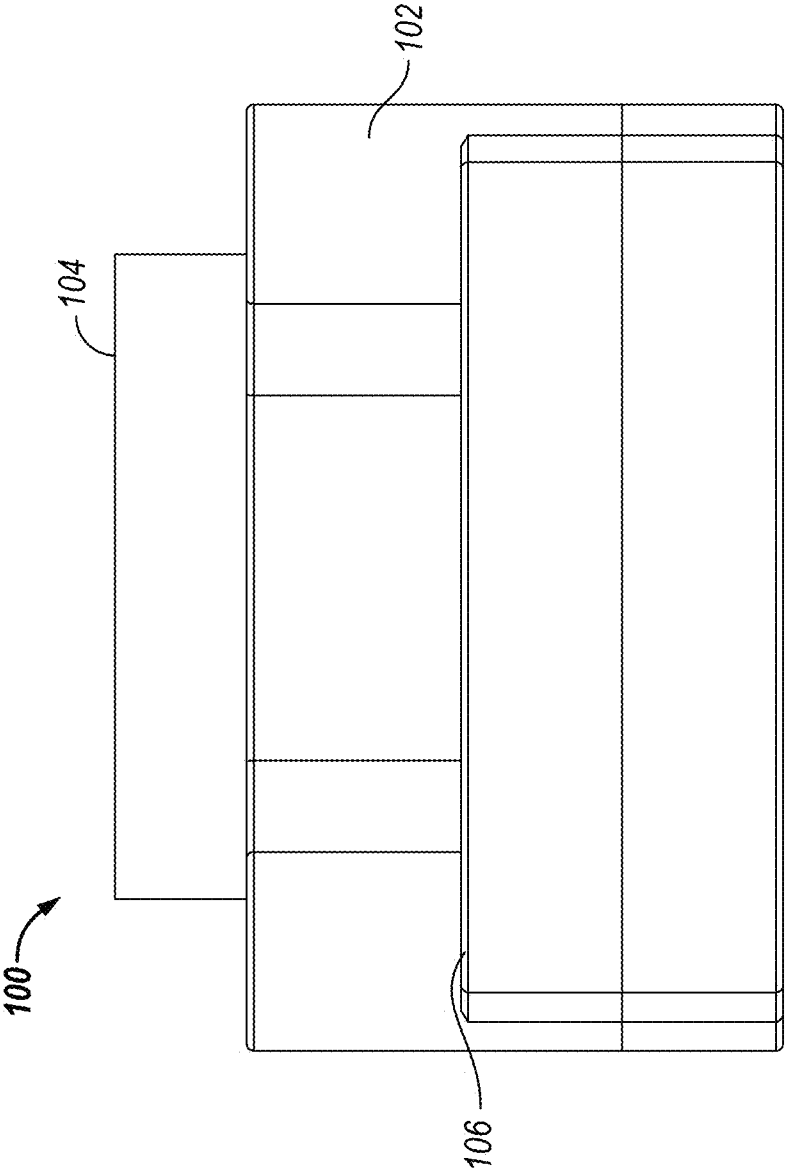
FIG. 4 depicts a front view of the torque tool according to exemplary embodiments.
Figure 5:
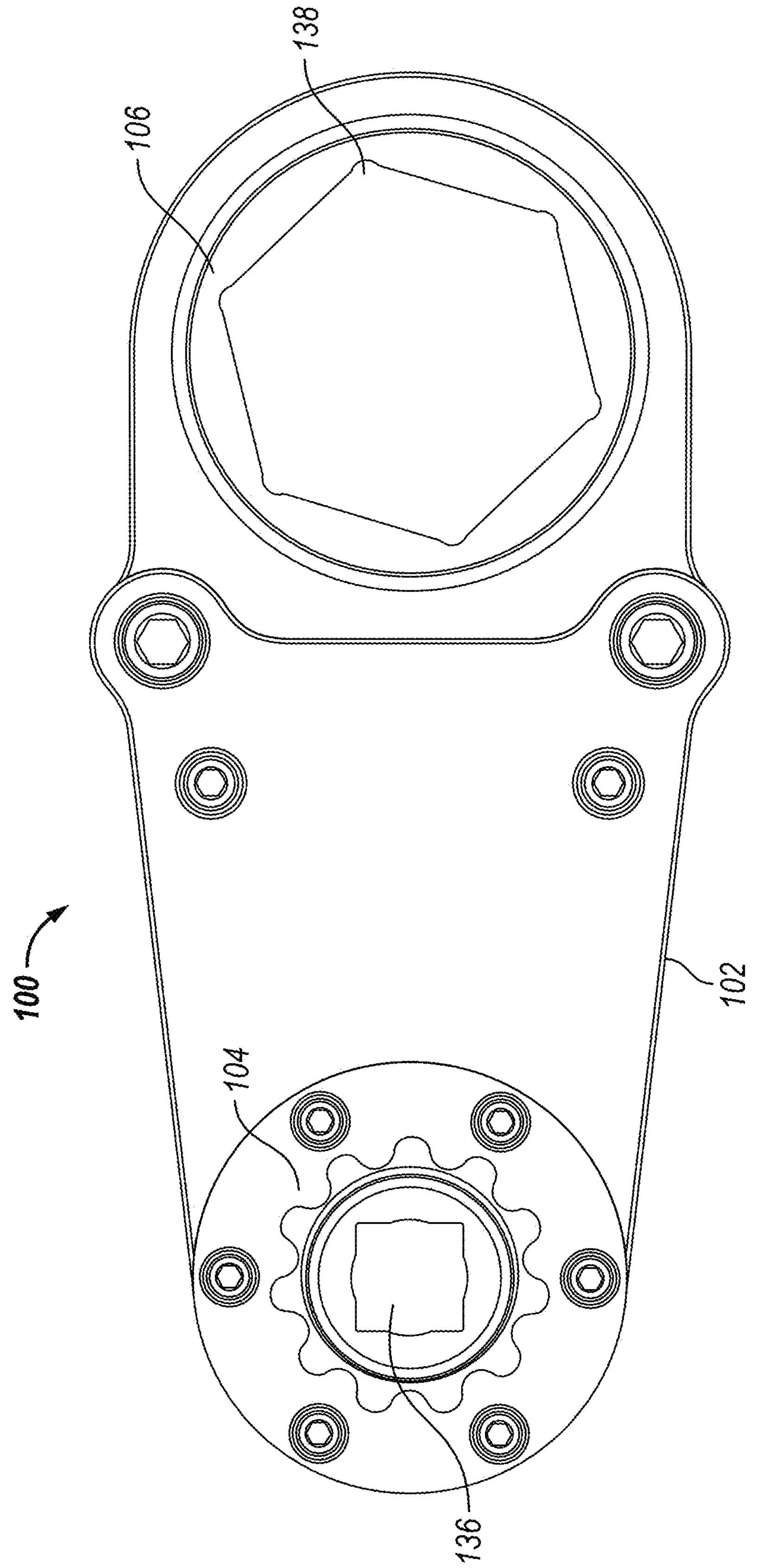
FIG. 5 depicts a top view of the torque tool according to exemplary embodiments.
Figure 6:
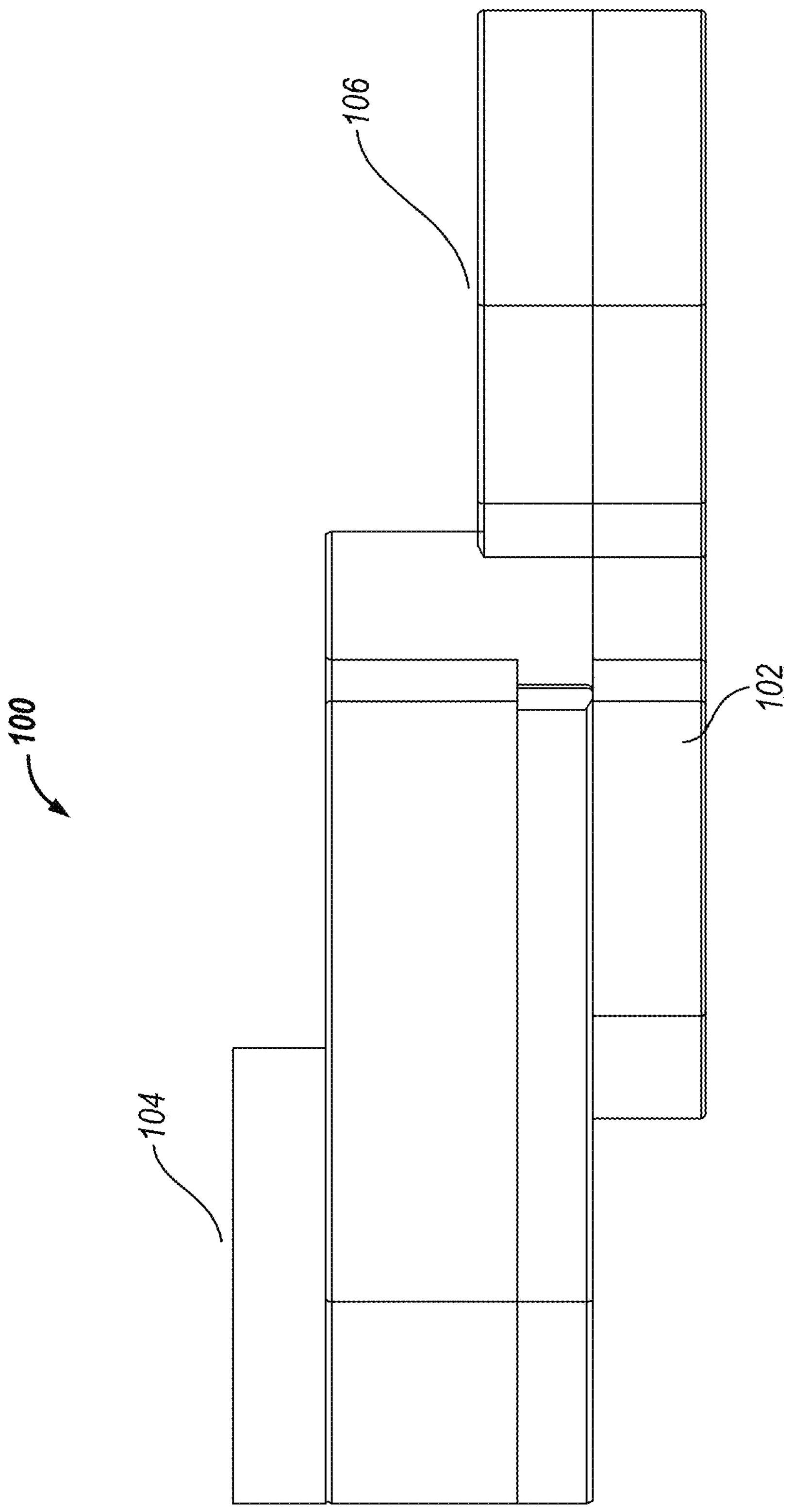
FIG. 6 depicts a side view of the torque tool according to exemplary embodiments.

Exemplary embodiments of the invention will now be described in order to illustrate various features of the invention. The embodiments described herein are not intended to be limiting as to the scope of the invention, but rather are intended to provide examples of the components, use, and operation of the invention.

According to exemplary embodiments, a torque tool is described. The tool has an input drive and an output drive. The tool is configured to receive a force input (i.e., torque) from an external source at the input drive. The external source may be a tool such as, a torque wrench or a nut runner (alternatively, nutrunner), nut driver, an impact driver and/or another tool or device as appropriate. The force input at the input drive is transmitted, in a perpendicular direction to the input force, through the tool by the gear train to an output drive. Thus, a torque applied at the input drive is transferred to the output drive. The output drive, when the tool is in operation with a force input, provides torque to rotate and tighten (or loosen) the fastener. In some embodiments, the direction of rotation of the output drive may be adjustable to either tighten or loosen the fastener.

Thus, in exemplary embodiments, the tool may provide torque augmenting by allowing the input drive to continuously rotate and prove an augmented torque at the output drive. Because of this configuration, the tool provides an offset configuration enabling it to be used in certain situations where an offset is called for, such as, for example, a flange bolt and nut, and the like. Further, the tool may be used in locations with a small clearance, such as, for example, between two flanges. The tool may have a factor that indicates how to compensate for the gear ratio when using the tool. That is, the desired torque at the fastener would be multiplied by this factor to determine the torque value needed to be applied at the input drive by the external source.

In various embodiments, the tool may have a right angle attachment. The right angle attachment allows for translation of an external force (i.e., torque) input from one direction to another direction that is at a right angle thereto. A bevel gear train is used to enable this force direction translation from the input to the gear train in the tool. This right angle attachment further provides flexibility in where the tool can be used and with respect to input drive options. The right angle drive is configured to receive a force input from an external source, such as described above. The right angle drive may have a square drive input. Other drive input configurations may be used. Additionally, it should be appreciated that the tool may be capable of being used in different orientations with the input drive facing upwards or downwards. In various embodiments, the right angle drive may be detachable from the body of the tool.

According to exemplary embodiments, the tool is able to provide torque in the range of up to about 1000 ft-lbs. In some embodiments, different torque values may be possible. The gear drive ratio is about 6:1. In some embodiments, a gear drive ratio of about 1:1, or about 2:1, or about 3:1, or about 4:1, or about 5:1 or other gear drive ratios may be used. In various embodiments, the gear drive ratio may be altered by changing the gear train.

The tool may be made of any suitable materials or combinations of materials, such as, but not limited to, steel, aluminum and/or plastics. The materials may be corrosion resistant. Certain portions of the tool may be made of hardened materials, such as hardened steel, to improve durability. Certain portions of the tool may be made of lightweight materials, such as aluminum and/or plastics, to reduce weight.

Figure 7A:
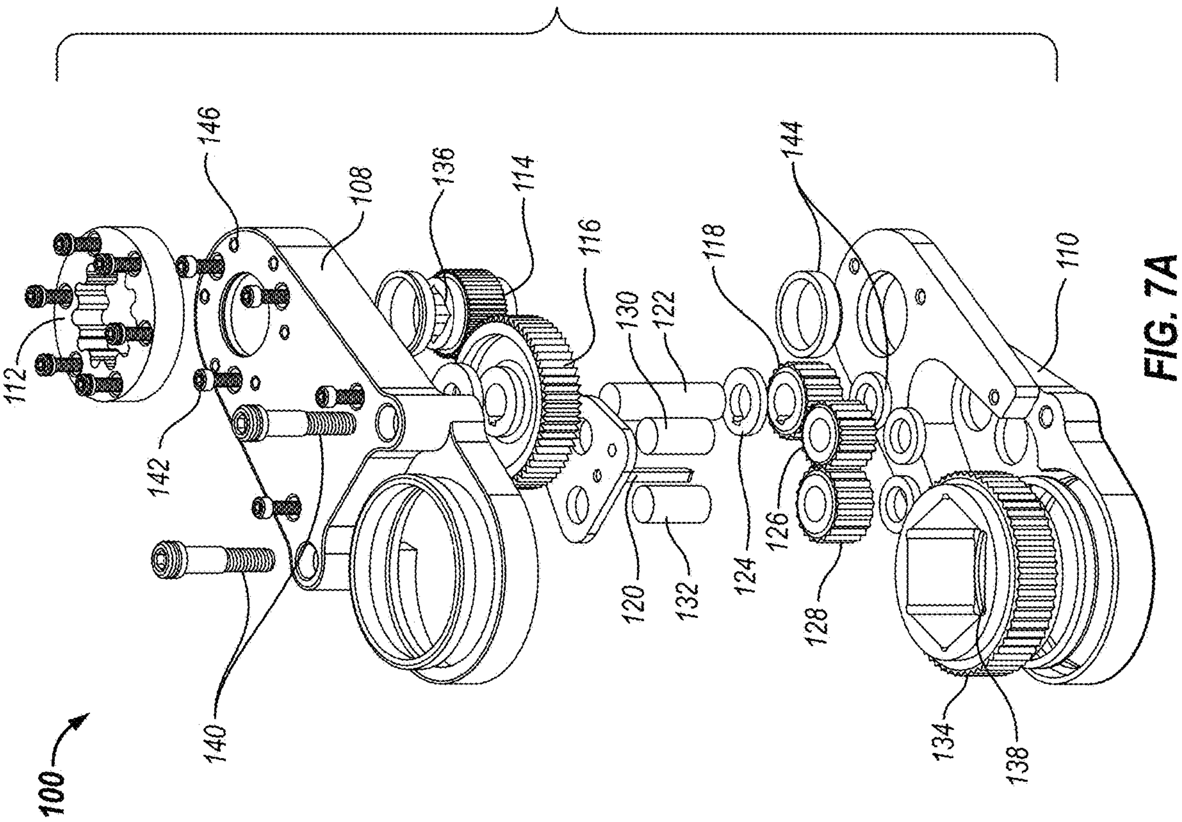
FIG. 7A depicts an exploded view of the torque tool according to exemplary embodiments.

FIGS. 1-7A/7B depict an exemplary embodiment of a torque tool 100 (which may be referred to herein as "the tool"). The tool 100 has a body, or housing, 102. One end of the tool has an input drive 104. The other end of the tool has an output drive 106. Connecting the input drive 104 to the output drive 106 is a gear train, which is depicted in FIGS. 7A and 7B. The gear train comprises a series of gears (114, 116, 118, 126, 128, 134).

The body (housing) 102 has two halves—an upper half 108 and a lower half 110. The upper half and the lower half may be joined together (e.g., fastened or secured) by a series of fasteners. The fasteners may be a combination of different sizes or types. For example, exemplary embodiments may have two larger screws 140 and a series of smaller screws 142. These fasteners may be removable to allow for disassembly of the tool for maintenance or repairs.

At the input drive 104 there may be a star nose adaptor 112. This adaptor 112 allows for use of a star drive. The adaptor 112 may be removably secured to the body 102 at holes 146, using a series of fastener. Other adaptors may be used. Internally, the tool has a square drive 136 that is part of a square drive gear 114. The square drive gear 114 serves as the input drive gear to the tool (i.e., the start of the drive gear train). Next in the gear train is a mid idle gear 116. A keyed idle gear 118 follows. Idle gears 126 and 128 follow in sequence. The last gear is hex gear 134. Hex gear 134 may have a hex drive socket or output 138. As depicted in the Figures, such as FIG. 1, the output drive 109 is configured with a six point hex socket or output 138. In some embodiments, a 12 point hex (bi-hex) socket may be used. It should be appreciated that the tool may come with different sized hex drives to provide applicability to a range of nut sizes. In various embodiments, the different sizes may be provided in metric and US sizes. The socket size may be changed by changing out the hex gear 134.

Keyed idle gear 118 is keyed to mid idle gear 116 by keyed gear pin 112 with square key 120. A keyed spacer 124 rests between gears 116 and 118.

Figure 7B:
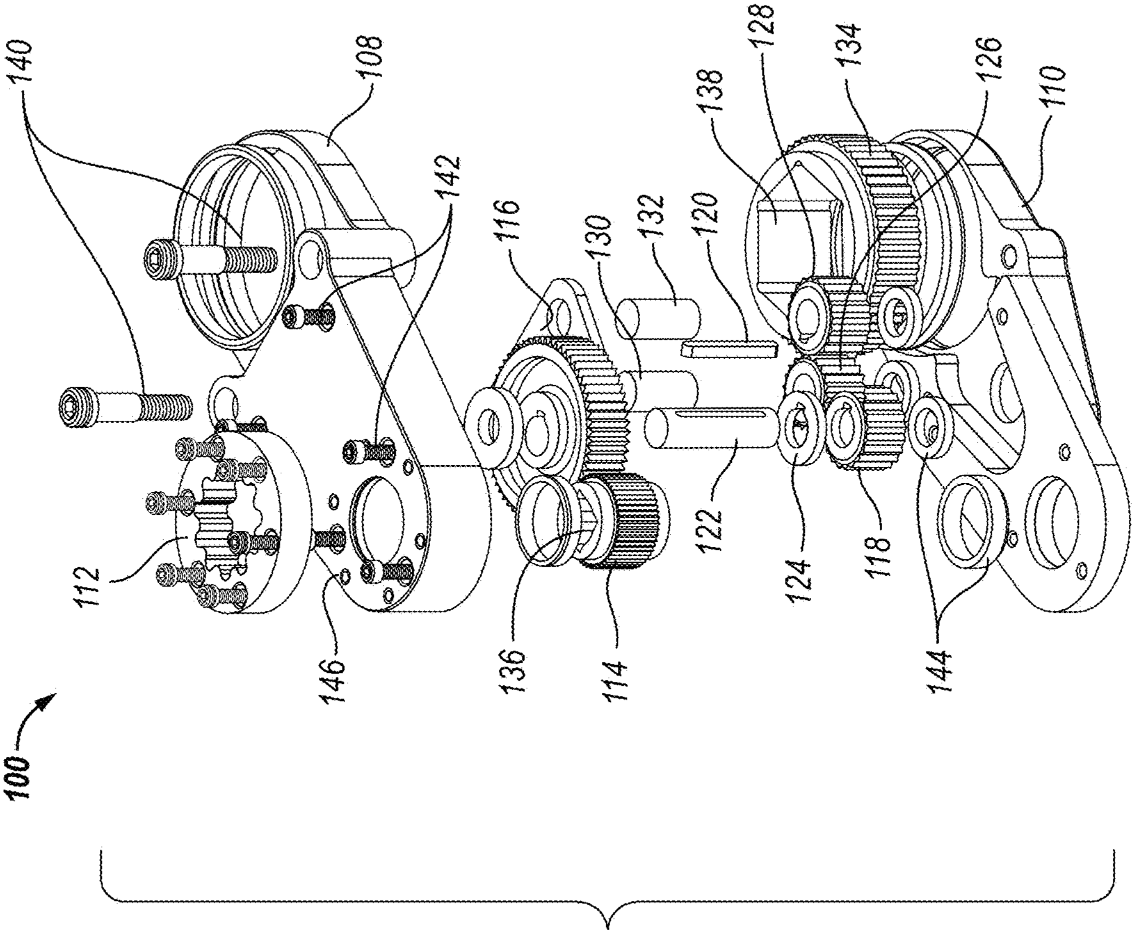
FIG. 7B depicts a second exploded view of the torque tool according to exemplary embodiments.
Figure 8:
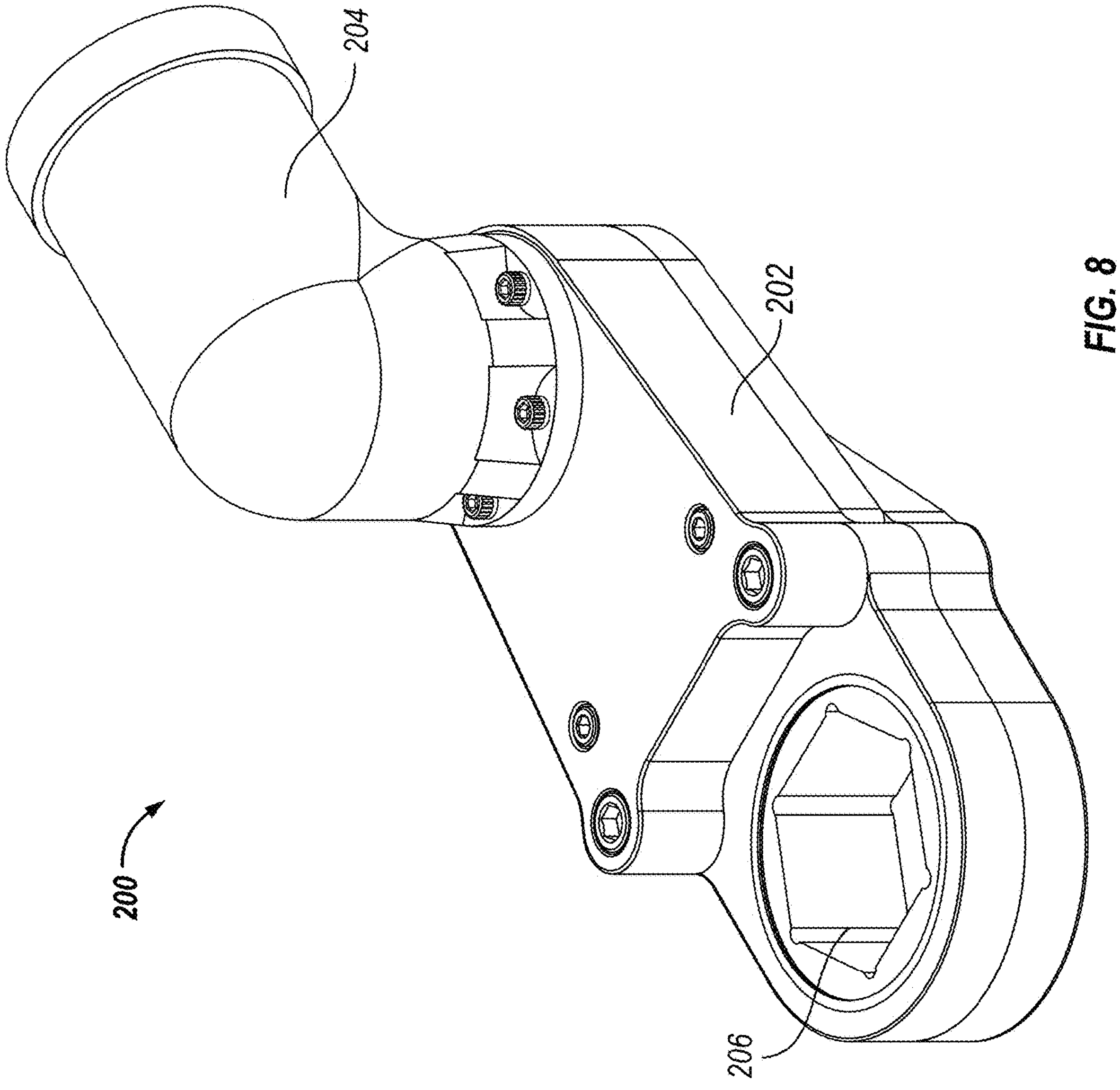
FIG. 8 depicts a perspective view of a torque tool with a drive input according to exemplary embodiments.
Figure 9:
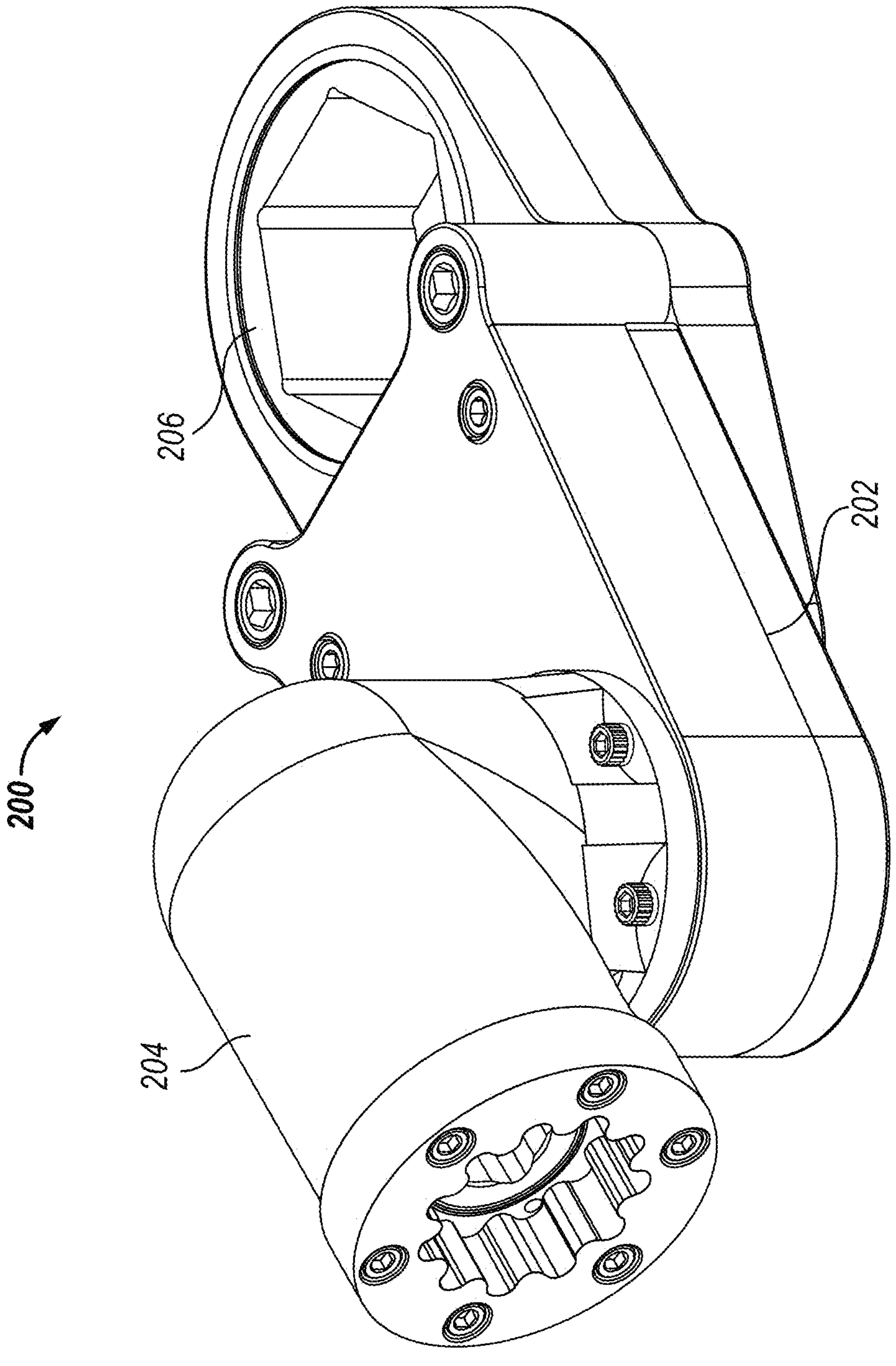
FIG. 9 depicts a second perspective view of the torque tool with a drive input according to exemplary embodiments.
Figure 10:
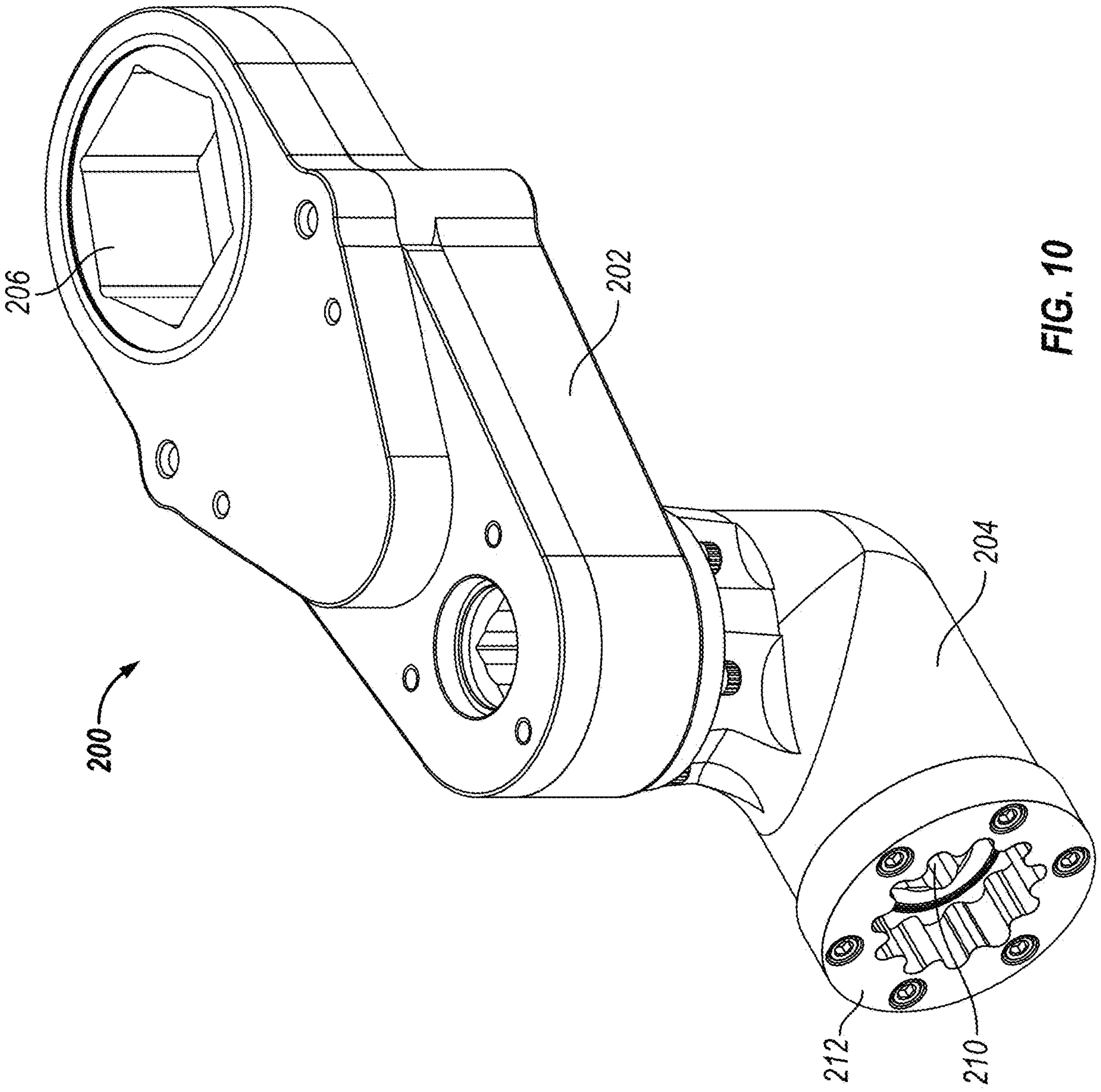
FIG. 10 depicts a bottom perspective view of the torque tool with a drive input according to exemplary embodiments.
Figure 11:
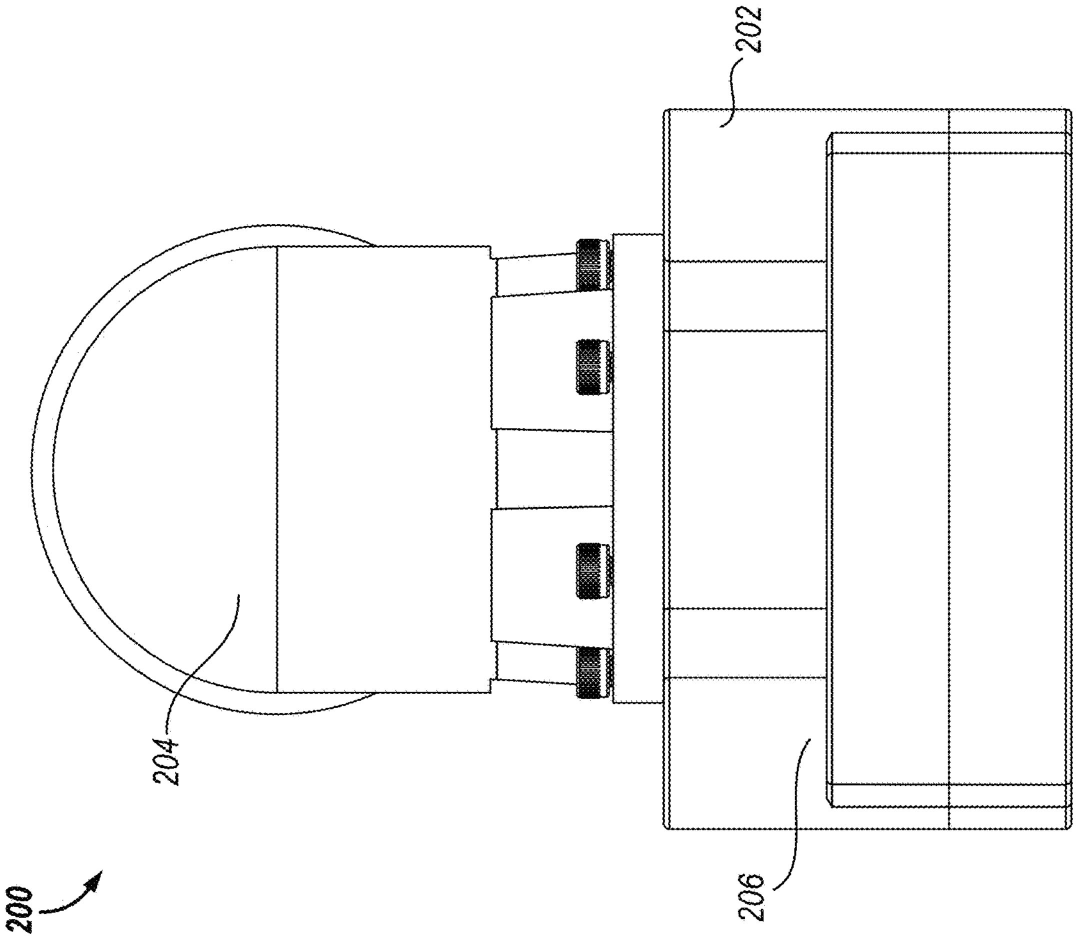
FIG. 11 depicts a front view of the torque tool with a drive input according to exemplary embodiments.
Figure 12:
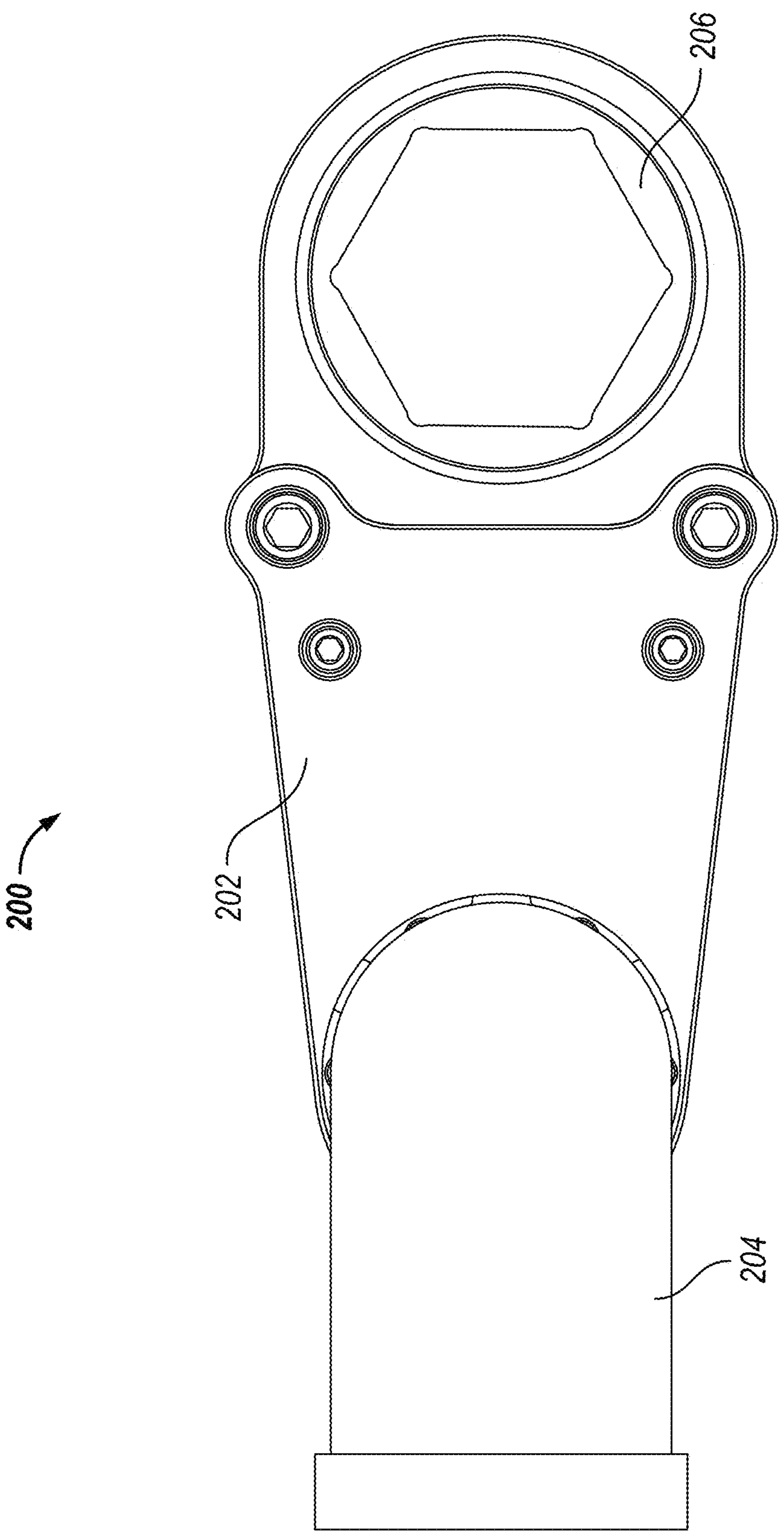
FIG. 12 depicts a top view of the torque tool with a drive input according to exemplary embodiments.
Figure 13:
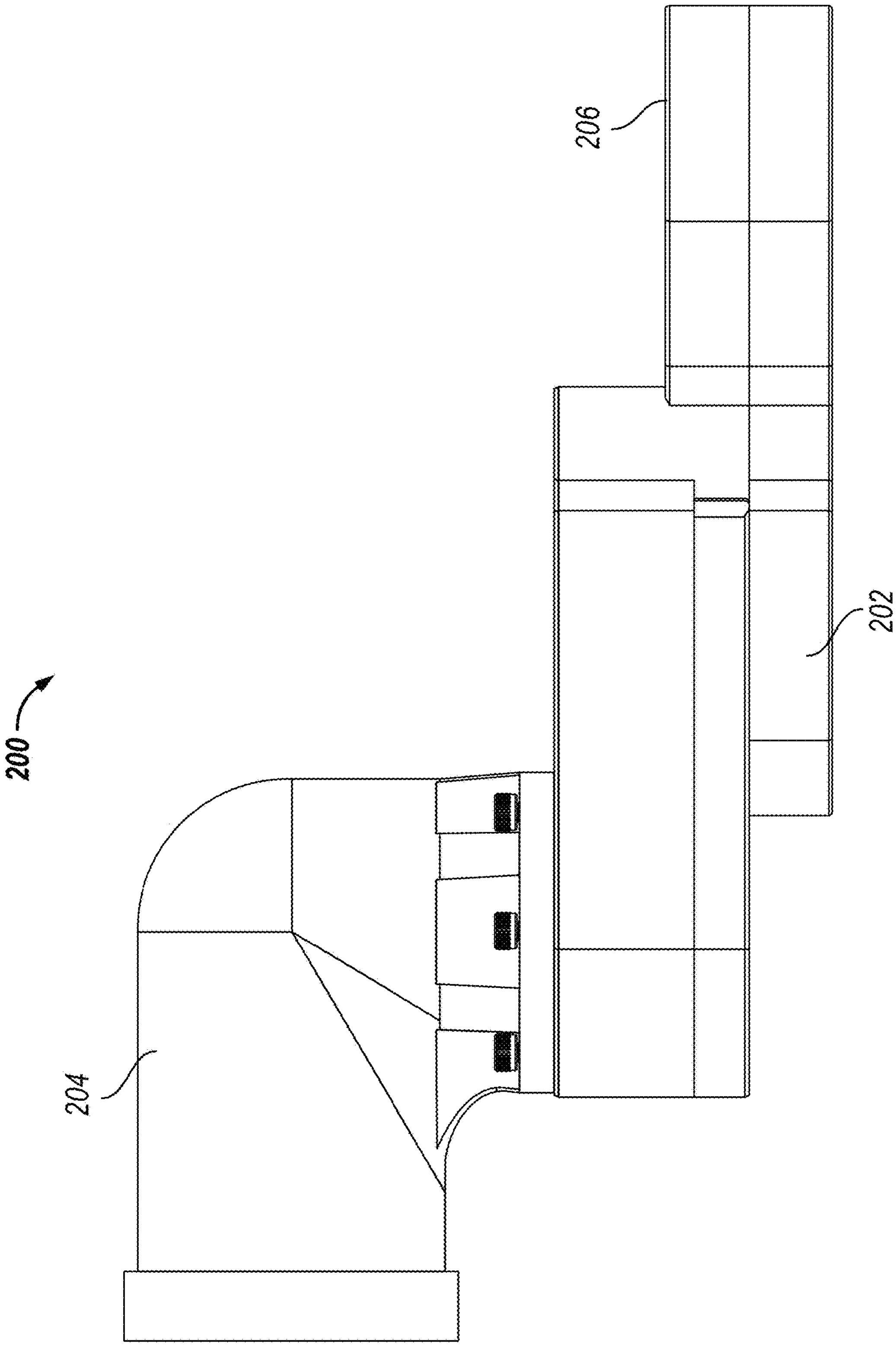
FIG. 13 depicts a side view of the torque tool with a drive input according to exemplary embodiments.
Figure 14A:
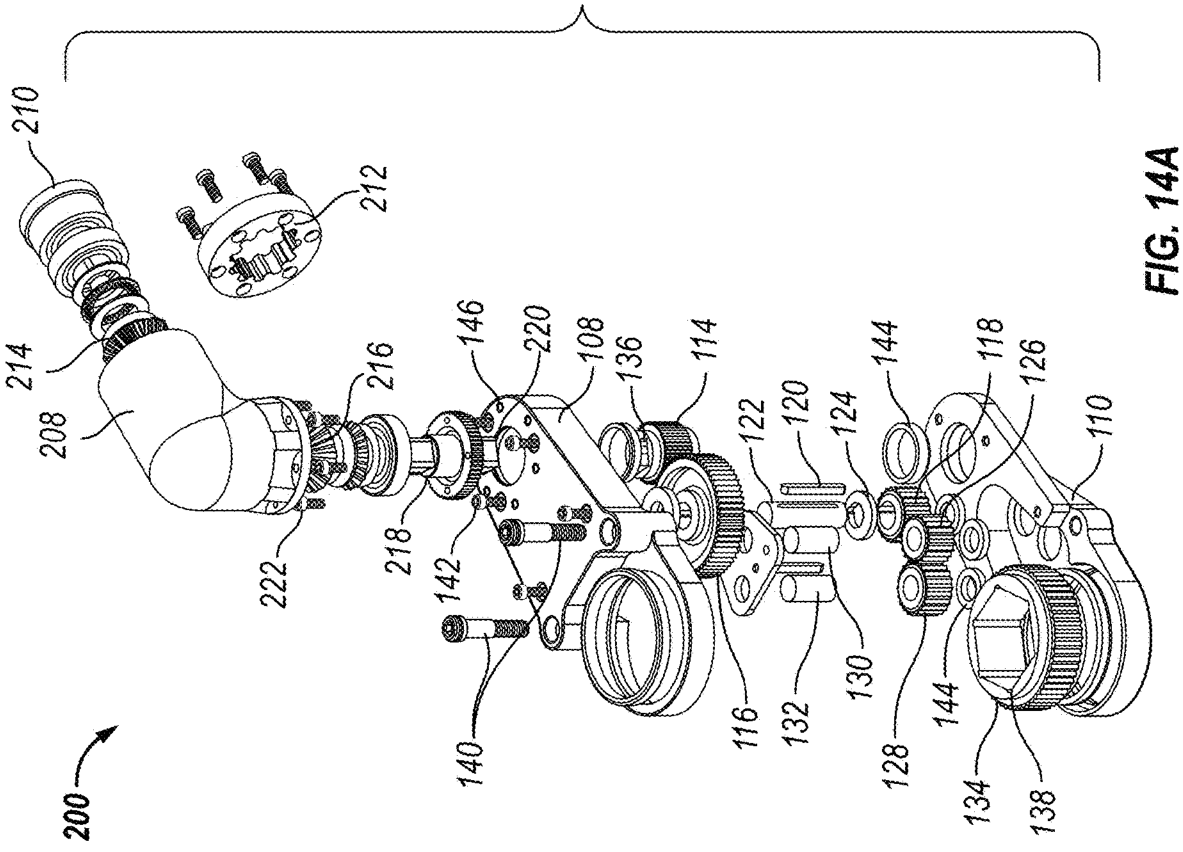
FIG. 14A depicts an exploded view of the torque tool with a drive input according to exemplary embodiments.
Figure 14B:
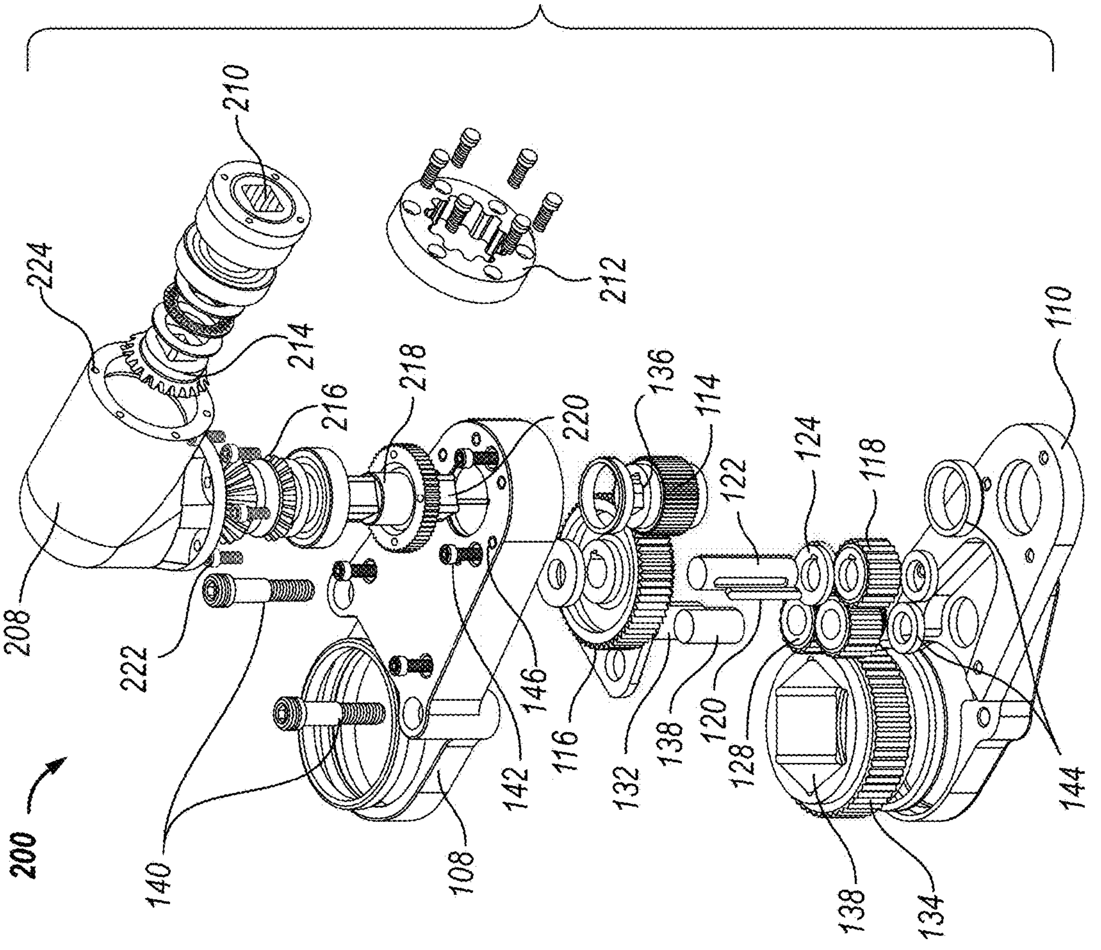
FIG. 14B depicts a second exploded view of the torque tool with a drive input according to exemplary embodiments.

Gears 126 and 128 have gear pins 130 and 132, respectively. The gear train also has a series of rings 144 to serve as spacers and bearings as can be seen in FIGS. 7A and 7B.

Exemplary specifications are as follows (it should be appreciated that these specifications are exemplary and non-limiting, and can change based on various embodiments as appreciated by one of ordinary skill in the art):

(dimensions are in inches; OD—outer diameter; PD—pitch diameter; LG—grip length)

hex socket 138—2.38 inch hex;
square drive 136—0.75 inch drive;
overall length of the tool 100—9.84 inches;
profile height of the tool 100—2.5 inches;
length of the tool 100 measured center of the square drive 136 to center of the hex socket 138—6.4 inches;
width of the tool 100 at the output drive end (106)—3.88 inches;
width of the tool 100 at the input drive end (104)—3 inches;
maximum with of the tool 100 (which is at a point just inward of the output drive 106 as can be see in the Figures)—4.42 inches;
thickness of the input drive end (104)—e 2.38 inches;
thickness of the output drive end (106)—1.5 inches;
square drive gear 114—1.50 OD×1.417 PD—34 TEETH;
mid idle gear 116—3.0 OD×2.917 PD 70 TEETH;
keyed idle gear 118—1.292 OD×1.208 PD—29 TEETH;
idle gears 126, 128—1.292 OD×1.208 PD—29 TEETH;
hex gear 134—3.625 OD×3.542 PD—85 TEETH;
gear pins 130, 132—0.625×1.25 LG;
gear pin 112—0.625×2.30 LG; and
square key 120—0.187×1.812 LG.

FIGS. 8-14A/14B depict another exemplary embodiment of a torque tool 200 (which may be referred to herein as "the tool"). The tool 200 has a body, or housing, 202. This is the same as the body 102 of the tool 100 described above. One end of the tool has an input drive 204. In this embodiment, the input drive is a right angle drive as will be described below. The right angle drive connects into the input drive portion of the tool 200, which is the same as the input drive 104 of the tool 100. The other end of the tool has an output drive 206. The output drive 206 is the same as the output drive 106 of the tool 100. Connecting the input drive 204 to the output drive 206 is an internal gear train, which can be seen in FIGS. 14A and 14B. The gear train comprises a series of gears to transmit input drive (from 204) to the output drive (206). Note that this gear train is the same as that of the tool 100. Indeed, the tool 200 may be the same as the tool 100 with the difference being the input drive 204. Thus, the description provided above with respect to FIGS. 1-7A/7B of the tool 100 and the internal gear train applies to the figures here and the parts of the housing 202 are the same as those of the housing 102 as described above according to exemplary embodiments. The internal parts of tool 200 have been labelled for ease of reference in FIGS. 14A/B.

The input drive 204 is a right angle drive as shown. The input drive 204 has a housing 208. The housing 208 is secured to the body 202 with a series of fasteners at holes 146. For example, screws 222 may be used. The housing 208 may be removably attached to the body 202. Other housings may be used. The housing provides cover for the input portion of the input drive 204 and the internal gear train of the right angle drive that translates and conveys the input to the right angle drive to the gear train within the body 202.

The input to the drive is a square drive 210 which is coupled to an input bevel gear 214. The input bevel gear is mated with a second bevel gear 216, located at a right angle thereto. The gear ratio of the right angle drive may be 1:1. However, in various embodiments, other gear ratios may be used. An output shaft 218 has a square drive adaptor 220 to mate with the square drive input of the gear train, which is described above with respect to FIGS. 7A/7B. That is, the square drive adaptor 220 mates with square drive input 136 on square drive gear 114. The remainder of the gear train is the same as that described above.

The input drive 204 may have a star drive adaptor 212, that may be removably secured thereto (i.e., that is, to the housing 208 at its face 224 using a series of fasteners (as shown with 212).

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

Further, it is to be understood that the terminology used herein is for the purpose of describing particular embodiments only and is not intended to be limiting. The terms "a" or "an" as used herein, are defined as one or more than one.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

What is claimed is:

1. A torque tool, comprising:

a body comprising two halves;

an input drive located at a first end of the body;

an output drive located at a second end of the body, the second end being located axially opposite the first end; and a gear train internal to the body such that the gear train mechanically couples the input drive to the output drive allowing for continuous transmission of torque from the input drive to the output drive, the gear train comprising: a square drive gear that directly receives an input from the input drive, the square drive gear drive is mated with a mid idle gear that is coupled to a keyed idle gear through a keyed gear pin having a square key, the keyed idle gear is mated with a first idle gear that is in turn mated to a second idle gear, the second idle gear being mated with a hex gear that contains the output drive.

2. The torque tool of claim 1, wherein the torque tool is configured to be used in an offset configuration.

3. The torque tool of claim 1, wherein the gear train has a final gear ratio of about 6:1.

4. The torque tool of claim 1, wherein torque of up to about 1000 ft-lbs is capable of being transmitted from the input drive to the output drive.

5. The torque tool of claim 1, wherein the transmitted torque between the input drive and the output drive is modified by a predetermined factor.

6. The torque tool of claim 1, wherein the output drive is a hex drive comprising a six point hex socket.

7. A torque tool, comprising:

a body comprising two halves;

an input drive located at a first end of the body;

a right angle drive mechanically coupled to the input drive by a gear set;

an output drive located at a second end of the body, the second end being located axially opposite the first end; and a gear train internal to the body such that the gear train mechanically couples the input drive to the output drive allowing for continuous transmission of torque from the input drive to the output drive, the gear train comprising: a square drive gear that directly receives an input from the input drive, the square drive gear drive is mated with a mid idle gear that is coupled to a keyed idle gear through a keyed gear pin having a square key, the keyed idle gear is mated with a first idle gear that is in turn mated to a second idle gear, the second idle gear being mated with a hex gear that contains the output drive.

8. The torque tool of claim 7, wherein the torque tool is configured to be used in an offset configuration.

9. The torque tool of claim 7, wherein the gear train has a final gear ratio of about 6:1.

10. The torque tool of claim 7, wherein torque of up to about 1000 ft-lbs is capable of being transmitted from the input drive to the output drive.

11. The torque tool of claim 7, wherein the transmitted torque between the input drive and the output drive is modified by a predetermined factor.

12. The torque tool of claim 7, wherein the gear set in the right angle drive comprises a bevel gear set.

13. The torque tool of claim 7, wherein the output drive is a hex drive comprising a six point hex socket.

* * * * *